Nov. 14, 1944.   R. K. MUELLER   2,362,842
PROPELLER BALANCING MECHANISM
Filed April 29, 1941
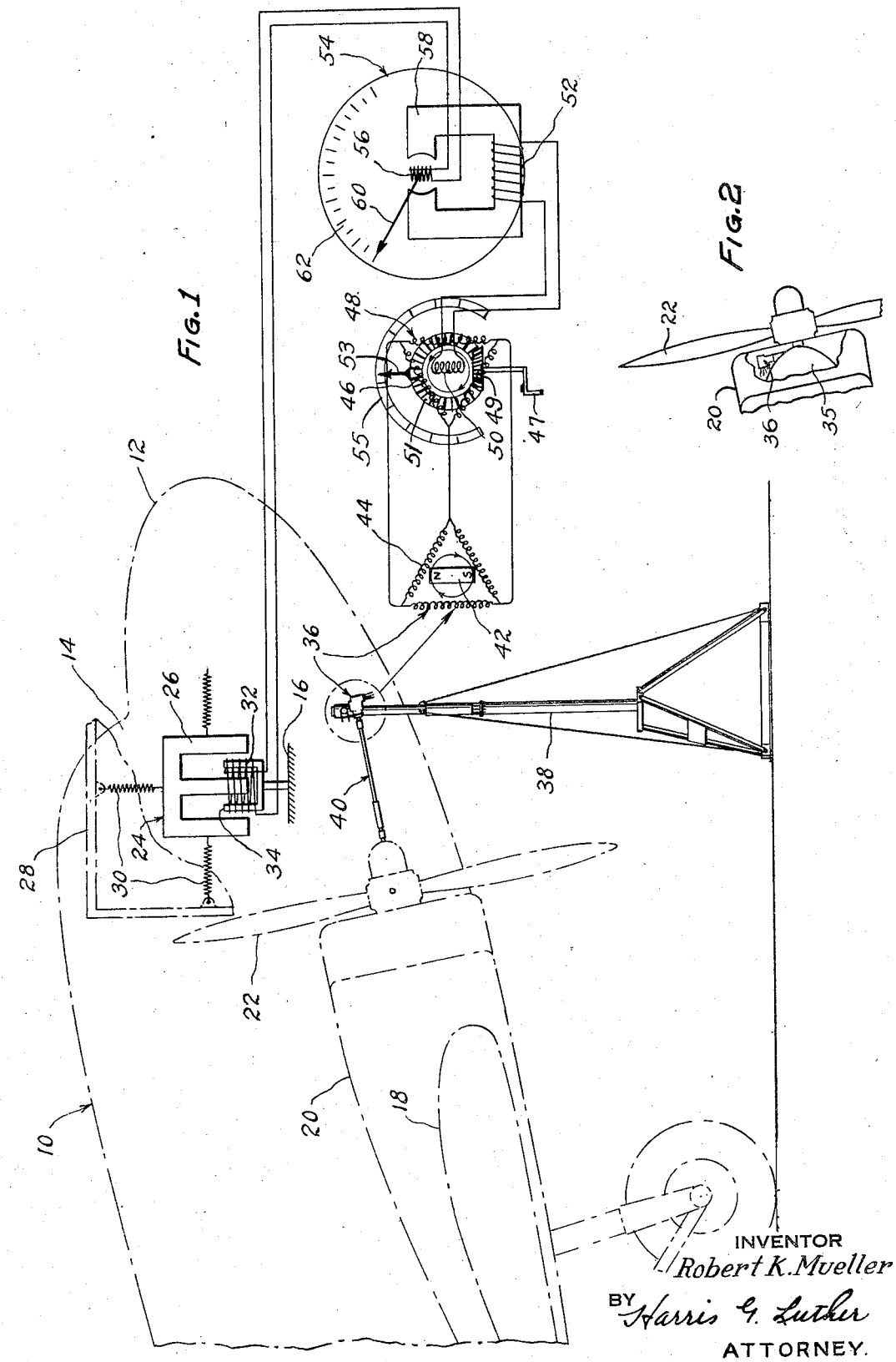
INVENTOR
Robert K. Mueller
BY Harris G. Luther
ATTORNEY.

Patented Nov. 14, 1944

2,362,842

UNITED STATES PATENT OFFICE

2,362,842

PROPELLER BALANCING MECHANISM

Robert K. Mueller, Erie, Pa., assignor to United Aircraft Corporation, East Hartford, Conn., a corporation of Delaware Application April 29, 1941, Serial No. 390,897

3 Claims. (Cl. 73—66)

This invention relates to an improved apparatus for balancing rotating bodies such as airplane propellers and has particular reference to apparatus for accurately determining the unbalance of an airplane propeller while mounted on the airplane and driven by the airplane engine.

An object of the invention resides in the provision of an improved apparatus for determining the location and amount of unbalance existing in a rotating body while the body is located in operative position and driven by its usual power means.

A further object resides in an improved apparatus for substantially eliminating propeller induced vibration from the structure of an airplane upon which the propeller is mounted.

Other objects and advantages will be more particularly pointed out hereinafter or will become apparent as the description proceeds.

In the accompanying drawing, in which like reference numerals are used to designate similar parts throughout, there is illustrated a suitable embodiment of an apparatus adapted to accomplish the balancing hereinabove referred to. The drawing, however, is for the purpose of illustration only and is not to be taken as limiting or restricting the invention since it will be apparent to those skilled in the art that various changes in the illustrated embodiment may be resorted to without in any way exceeding the scope of the invention.

In the accompanying drawing, Fig. 1 is a diagrammatic illustration of an apparatus which may be utilized to determine the position and amount of the unbalance of air airplane propeller when the propeller is operatively mounted on the airplane and driven by the airplane engine. Fig. 2 is a modification of the apparatus shown in Fig. 1.

Although methods have now been developed by means of which an aeronautical propeller can be factory balanced at assembly to nearly perfect condition of static and aerodynamic balance, this initial condition does not necessarily continue for the service life of such a propeller since propellers have now been developed to a state of perfection at which they will render many hundred hours of satisfactory service. During operation a certain amount of wear of the propeller parts and of erosion of the propeller blades necessarily takes place. The wear is mainly incident to pitch changing operation of a controllable-pitch propeller while the erosion is mainly due to grooving and other marring of the propeller blade surfaces by particles which come in contact with the blades during landing and take-off maneuvers of the airplane. As a noticeable scratch may lead to a serious concentration of stresses in the blade, it is customary at each overhaul of the propeller to refinish the blades to remove all grooves and scratches from the surfaces thereof. This necessitates the removal of a certain amount of material from the propeller blades and, while an effort is made to remove the same amount of material at approximately the same location from each of the blades of a propeller during these overhaul operations, it is found that it is not possible to maintain the propeller in perfect balance over a series of such overhauls and that because of this conditions and the above mentioned wear in the propeller parts, and in the propeller supporting bearings of the engine, sufficient unbalance will accrue to enable the propeller to set up an objectionable vibration which is transmitted to the structural parts of the airplane. Frequently some structural part of the airplane will be in resonance with this propeller vibration at some operative speed of the airplane, particularly at cruising operation, and a very objectionable operating condition is thereby induced.

It is not considered practical to separately analyze the mass and aerodynamic unbalance components in the field to correct these imperfections separately since the amount of total unbalance is not excessive in any propeller that is considered fit to continue in operation, and a correction of the total unbalance by the application of suitable counterweights which will smooth out the propeller vibration at the speed range used for the longest continued periods of operation, that is the cruising speed range, has been considered entirely satisfactory from practical considerations.

In correcting for propeller unbalance the vibration of some portion of the airplane structure, for example, the floor of the pilot's compartment, is calibrated against a known propeller unbalance and correlated with the rotation of the propeller and from this calibration and correlation the amount and position of a corrective counterbalance for the propeller may be determined. While the tests of propeller unbalance may conveniently be made on the ground, it is quite possible to conduct these tests while the airplane is in flight so that a correction at the most frequently used flight altitude can be obtained.

The apparatus for determining the magnitude and rotation of propeller unbalance will now be described in detail in connection with the accompanying drawing in which the apparatus utilized is schematically illustrated.

In the accompanying drawing, the numeral 10 generally indicates the aircraft which may be a single or multi-engine aircraft. The aircraft illustrated is of a multi-engine type and has a fuselage 12 containing a pilot's compartment 14 provided with a floor 16 and mounted upon a wing 18 which carries two or more engine nacelles, one of which is indicated at 20, enclosing an engine, not illustrated, to which is operatively connected a propeller 22. An electrical pick-up, generally indicated at 24, may be placed on the compartment floor 16 to produce electrical impulses in accordance with the vibrations transmitted to it through the floor structure. This pick-up may have an armature 26 flexibly supported in a casing 28 by suitable resilient means such as the spring 30 and a coil 32 mounted on a suitable core 34 firmly secured to the casing. This is known as a siesmic type of electrical pick-up and contains certain suspension and damping features which act to stabilize the electrical impulses produced by the pick-up in the operative range and avoid a condition of resonance between the natural frequency of the pick-up and the vibration frequency within the range of vibrations for which the pick-up is designed to operate.

A three phase electric alternating current generator, generally indicated at 36, is mounted adjacent the engine-propeller combination upon a suitable collapsible stand 38 adapted to be set up in front of the propeller when ground tests are being made and the generator is connected with the propeller hub by a suitable coupling 40 having a relatively high degree of flexibility in angular directions so that the alignment of the generator shaft with the propeller shaft does not have to be obtained with a high degree of accuracy. For flight tests the generator may be mounted as shown in Fig. 2 at some location on the engine 35 at which it may be driven at propeller speed.

The generator 36 has a two pole armature 42 rotatable with the propeller and a three phase field 44 connected to the three phase field 46 of an angularly adjustable transformer generally indicated at 48, remote from said engine-propeller combination and generator to produce a rotating electrical effect in the field of the transformer. The core of the transformer 48 is a single phase coil 50 manually rotatable relative to the field 46 by means such as crank 47 and bevel gears 49 and 51 so that the inductive action between the field and the core can take place at any selected angle of the core relative to the field. The angle of the core relative to the field may be indicated on the stationary scale 55 by the pointer 53 movable with the core. By this means the effective angular position of the generator 36 relative to the propeller 22 can be manually shifted electrically by the use of the remote control transformer or phase shifter 48. The core 50 of the transformer 48 is connected with the field coil 52 of an electric wattmeter usually adjacent said transformer and generally indicated at 54. This wattmeter has a movable coil 56 mounted to swing in the field produced in the core 58 by the field coil 52 and carrying a pointer 60 which swings over a graduated dial 62. The movable coil 56 is electrically connected with the coil 32 of the pick-up 24. With this arrangement the pick-up will produce current impulses in the coil 56 while the generator 36 will produce current impulses in the coil 52. When these impulses are in phase a torque will be exerted on the movable coil proportional to the product of the current strength in the two coils and this torque will vary as the phase relation between the two coils varies being zero when the current impulses in the two coils are out of phase or ninety degrees apart in time relationship.

From this description it is at once apparent that if the pick-up 24 produces an alternating current having a simple harmonic component at propeller speed, the rotational position of the propeller at which the current producing vibration occurs can be easily ascertained by rotating the transformer core 50 until the reading of the meter 54 is brought to zero, it being assumed of course that the angular relationship between the core 50, the generator armature 42 and the propeller is known, having been fully ascertained at the time the generator is drivingly connected with the propeller. A zero reading of the wattmeter can be obtained regardless of any difference between the strength of the current impulses generated by the pick-up 24 and the generator 36 since a zero reading will occur in any case when the impulses from the two devices are brought to a condition in which they are ninety degrees out of phase. The angular position of the core 50 at which this zero reading occurs will indicate the angular position of the propeller at which the peak voltages of the generator and the peak voltage of the pick-up are ninety degrees out of phase. The wattmeter indication at a position of the core 50, ninety degrees from the above zero reading position in the direction of positive meter indications will constitute a measure of the magnitude of the initial unbalance.

In actual practice the electrical pick-up 24 does not produce a simple harmonic current alternating at propeller speed but does include a component of this nature in the complex current form generated by it. The remaining components of the pick-up output are, however, substantially nullified by the particular construction of the wattmeter 54 the movable coil 56 of which has a large inertia and very high degree of rotational damping so that it in effect, responds only to the torque effect of the component of the pick-up output which occurs in synchronism with the rotational speed of the propeller.

The magnitude of the propeller unbalance may be satisfactorily determined by the use of a trial weight of known mass which may be attached to the propeller at a known distance from the axis of rotation.

After the position of the core 50 for zero reading of the wattmeter 54 has been ascertained, the core is rotated ninety degrees from this position and the reading of the wattmeter observed. The trial weight is then attached to the propeller in a predetermined position and the core 50 is rotated to obtain a zero reading of the wattmeter in the manner indicated above and is then moved ninety degrees from that position and the reading of the wattmeter is again observed. Having now measured the effect of the original unbalance of the propeller as to both its magnitude and angular position with respect to the alternator and having also measured the combined effect of unbalance due to the original unbalance plus the added trial weight, both as to relative position and magnitude, it now becomes possible, by the use of appropriate algebraic or graphical methods, to subtract the effect of the original unbalance from that of the combined unbalance leaving as a result a measurement of the magnitude and location of the unbalance effect caused by the addition of the trial weight. Since the location and magnitude of the force unbalance produced by this weight is known, the resultant reading of the wattmeter can now be reduced to desired units so that a certain number of graduations on the wattmeter dial will represent a definite force unbalance acting on the propeller and the direction of this force may also be determined. Having now calibrated the wattmeter to read in known units of unbalance, the trial weight may be removed and a counterbalance weight added to the propeller as indicated by the amount and direction of the original unbalance of the propeller. This counterweight, so calculated, will be found to satisfactorily smooth out the propeller vibrations, both mass and aerodynamic, over substantially the entire range of operating speeds and may be adjusted for some selected altitude in case it is found from trial tests that vibration, due to aerodynamic unbalance, returns when the altitude is varied from that at which the balancing test was made to a particular flight altitude.

In balancing the propellers of a multi-engine airplane, one propeller can be balanced at a time and in flight testing the effect of another propeller may be eliminated by setting such other propeller to run at a speed different from the speed of the propeller being tested.

The following is a further explanation of the mathematics involved in determining the actual magnitude of the propeller unbalance, assuming that the only vibration existing in the airplane is at the frequency of propeller rotation, at some point in the structure, say the cockpit floor, the motion has a certain time relation to the propeller angle, that is to say, when the point is at its highest position blade number 1 may be thirty degrees ahead of top center. Since the motion is assumed to be simple harmonic the point will be centered at one hundred and twenty degrees, in lowest position at two hundred and ten degrees, and centered again at three hundred degrees. The displacement of the point (or its vertical component if other components exist) may be expressed as Displacement,
$$x = A \cos(\omega t + \phi)$$

where
$$\omega = \frac{2\pi \times \text{RPM}}{60}$$

$t$ = time in seconds
$\phi = 30/57.3$ radians = distance in radians traversed by blade number 1 from top center before vibrating point of structure reaches highest position
$\omega t$ = angle of blade number 1 in radians measured from top center
$A$ = maximum amplitude of vibration As the unbalance changes, both $A$ and $\phi$ in this expression will change, for obviously, if unbalance is increased the amplitude of vibration will increase proportionately in a linear system, and if it is moved to a different angular position with reference to the propeller the vibration will occur sooner or later depending upon whether the change is in the direction of rotation or opposite.

Suppose $A$ and $\phi$ in the above expression have been determined at a certain point, in a certain direction, and at a certain propeller R. P. M. due to some initial unbalance in the propeller, and a known weight is added to blade number 1 at a known distance from the propeller axis. It will now be possible to determine a new $A$ and $\phi$ which will be appropriate to the combined unbalance now existing. The principle of superposition applying to all linear systems, that is, those in which effect is proportional to cause, states that the effect of a combined unbalance like the one above is the same as the sum of the effects of the component unbalances acting separately. Therefore, it should be possible to determine an $A'$ and $\phi'$ for the added unbalance alone which will then give us a relation between structural vibration at the chosen point and R. P. M., and the magnitude and angular position on the propeller of any unbalance in the same plane. This information will then constitute a "calibration" of the airplane for the chosen point and R. P. M. and provides the basis for a simple determination of the unbalance which originally existed and its subsequent correction. From the principle of superposition:

| Due to added unbalance | Due to combined unbalance | Due to initial unbalance |

$$A' \cos(\omega t + \phi') = (A_2 \cos(\omega t + \phi_2)) - (A_1 \cos(\omega t + \phi_1))$$

By substituting the trigonometric relation for the cosine of the sum of two angles and then factoring out the coefficients of $\cos \omega t$ and $\sin \omega t$, an equation is determined wherein the coefficient of $\cos \omega t$ and the coefficient of $\sin \omega t$ must individually be zero in order that this equation be satisfied for all values of $\omega t$. The two resulting equations may be solved simultaneously for $A'$ and $\phi'$ to give the following formulas.

$$A' = \sqrt{(A_2 \cos \phi_2 - A_1 \cos \phi_1)^2 + (A_2 \sin \phi_2 - A_1 \sin \phi_1)^2}$$

$$\phi' = \tan^{-1} \frac{A_2 \sin \phi_2 - A_1 \sin \phi_1}{A_2 \cos \phi_2 - A_1 \cos \phi_1}$$

with $A_1$, $\phi_1$ and $A'$, $\phi'$ known we are in a position to calculate the initial unbalance from which the required correction may be found simply as a mass diametrically opposite on the propeller and having the same moment. Thus, if $$A_1 = nA'$$
$$\phi_1 = \phi' + \Delta\phi$$

the initial unbalance must have had $n$ times the moment of the added unbalance (measured in inch ounces or similar units) and must have been located $\Delta\phi$ radians from blade number 1 measured in the direction of propeller rotation. The required correction is a mass located so as to have a moment of $nA'$ and at an angle of $$(180 + \Delta\phi \times 57.3)$$

degrees ahead of blade number 1.

While a suitable explanation of a suitable apparatus has been hereinabove described and illustrated in the accompanying drawing for the purpose of disclosing the invention, it is to be understood that the invention is not limited to the particular apparatus so described and illustrated, but that such changes in the parts of the apparatus and the arrangement thereof may be resorted to as come within the scope of the subjoined claims.

Having now described the invention so that others skilled in the art may clearly understand the same, what it is desired to secure by Letters Patent is as follows:

1. In apparatus for balancing a rotating body including a device for producing a series of electric current impulses when subjected to vibration caused by unbalance of said rotating body, a multi-phase generator driven in timed relation with and located adjacent to said rotating body for producing another series of current impulses when rotated with said rotating body, and a two coil measuring device for indicating the in phase product of said two series of current impulses; control means remote from said rotating body and said generator for shifting the angular relationship between the output of said generator and said rotating body comprising a manually adjustable phase shifting transformer spaced from said rotating body and said generator and having a multi-phase portion electrically connected with said generator and a manually rotatable single-phase portion electrically connected with the field coil of said measuring device, and means for feeding said vibration induced current impulses to said measuring device.

2. Apparatus for balancing an airplane engine-propeller combination while the propeller is in place on the airplane and driven by its own engine comprising a device for generating a series of electrical impulses in accordance with the vibratory movements of some portion of the airplane structure, a polyphase generator located adjacent to and driven by the engine and producing a series of electrical impulses at the same frequency as the speed of rotation of said propeller and in a fixed phase relation thereto, a transformer located in a position remote from said engine and propeller and generator, means for feeding the output of said generator into said transformer, said transformer having means for transforming the multiphase output of said generator into an output of a series of single phase electrical impulses and having means for varying and means for indicating the phase relationship between the output of said transformer and said propeller, means for feeding the output of said transformer and the first mentioned series of electrical impulses into a measuring device located adjacent said transformer said measuring device having means for measuring the product of any coincident portions of the two series of electrical impulses fed thereto so that the magnitude and location of the propeller-engine unbalance may be determined by comparing the readings on the measuring device and the indications of the phase varying device respectively.

3. Apparatus for testing the balance of an airplane propeller while the propeller is in place on the airplane and driven by its own engine comprising, a pickup device for generating a series of electrical impulses in response to the vibratory movements of some portion of the airplane structure, a polyphase generator located closely adjacent to and coupled with the propeller to be driven thereby for producing a series of electrical impulses at the same frequency as the speed of rotation of said propeller and in a fixed phase relation thereto, said generator having a stationary polyphase winding, a phase-shifting transformer located at a position remote from said propeller and generator, said transformer having a stationary polyphase winding and a movable single-phase winding manually adjustable to alter the angular relationship between it and the stationary winding, an electrodynamometric indicating means having two coils angularly movable relative to each other, electrical conductors connecting the movable winding of the transformer with one coil of the indicating means and the pickup device with the other coil of the indicating means and also connecting the stationary winding of the generator to the stationary winding of the transformer, whereby the amount of the unbalance of the propeller may be read from the indicating means when the manual adjustment of the phase shifting transformer produces a maximum response of said indicating means and the phase angle of the unbalance is indicated by the position of the movable winding of the transformer when adjusted to cause a minimum response of the indicating means.

ROBERT K. MUELLER.